United States Patent

Baldwin

(10) Patent No.: US 9,686,387 B2
(45) Date of Patent: Jun. 20, 2017

(54) GENERATION OF MOBILE DEVICE VIBRATORY NOTIFICATION

(71) Applicant: AT&T Intellectual Property I, L.P., Atlanta, GA (US)

(72) Inventor: Christopher Baldwin, Crystal Lake, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 340 days.

(21) Appl. No.: 13/868,476

(22) Filed: Apr. 23, 2013

(65) Prior Publication Data

US 2014/0315602 A1   Oct. 23, 2014

(51) Int. Cl.
 G06F 3/00 (2006.01)
 H04M 1/02 (2006.01)
 G06F 1/16 (2006.01)
 H04M 19/04 (2006.01)

(52) U.S. Cl.
 CPC ........ H04M 1/0268 (2013.01); G06F 1/1652 (2013.01); H04M 19/047 (2013.01); *H04M 2250/12* (2013.01)

(58) Field of Classification Search
 CPC ..... G06F 3/016; H04M 19/047; H04M 1/047; H04R 2440/05; H04W 4/12; H01L 41/094
 USPC .................. 455/566; 345/156, 173
 See application file for complete search history.

(56) References Cited

U.S. PATENT DOCUMENTS

| | | | |
|---|---|---|---|
| 8,344,862 B1* | 1/2013 | Donham | 340/407.1 |
| 2006/0046031 A1* | 3/2006 | Janevski | G06F 3/016 |
| | | | 428/195.1 |
| 2007/0202917 A1* | 8/2007 | Phelps et al. | 455/556.1 |
| 2010/0267424 A1* | 10/2010 | Kim et al. | 455/566 |
| 2011/0095975 A1* | 4/2011 | Hwang | G06F 3/016 |
| | | | 345/156 |
| 2012/0242592 A1* | 9/2012 | Rothkopf et al. | 345/173 |
| 2012/0313862 A1 | 12/2012 | Ko et al. | |
| 2013/0002587 A1* | 1/2013 | Biggs | G06F 3/0418 |
| | | | 345/173 |
| 2013/0328447 A1* | 12/2013 | Park | H01L 41/0973 |
| | | | 310/332 |
| 2014/0285983 A1* | 9/2014 | Choi et al. | 361/749 |

OTHER PUBLICATIONS

SingularityHUB, Buttons Morph Out of your Touchscreen with Tactus, Jun. 2012 (Jun. 2012) [retrieved on Jun. 3, 2013 (Jun. 3, 2013)]. Retrieved from the internet:,URLhttp://singularityhub.com/2012/06/05/buttons-morph-out-of-your-touchscreen-with-tactus/#13639612536201&25447::resize_frame|0-0.

* cited by examiner

*Primary Examiner* — Ganiyu A Hanidu
(74) *Attorney, Agent, or Firm* — Cantor Colburn LLP

(57) ABSTRACT

A mobile device includes a housing; a flexible display mounted in the housing; an actuator coupled to the flexible display; a processor; and a computer readable medium with computer-executable instruction stored thereon, that when executed by the processor cause the processor to initiate operations including: generating a vibratory notification by sending a command signal to the actuator to alter a position of the flexible display.

11 Claims, 10 Drawing Sheets

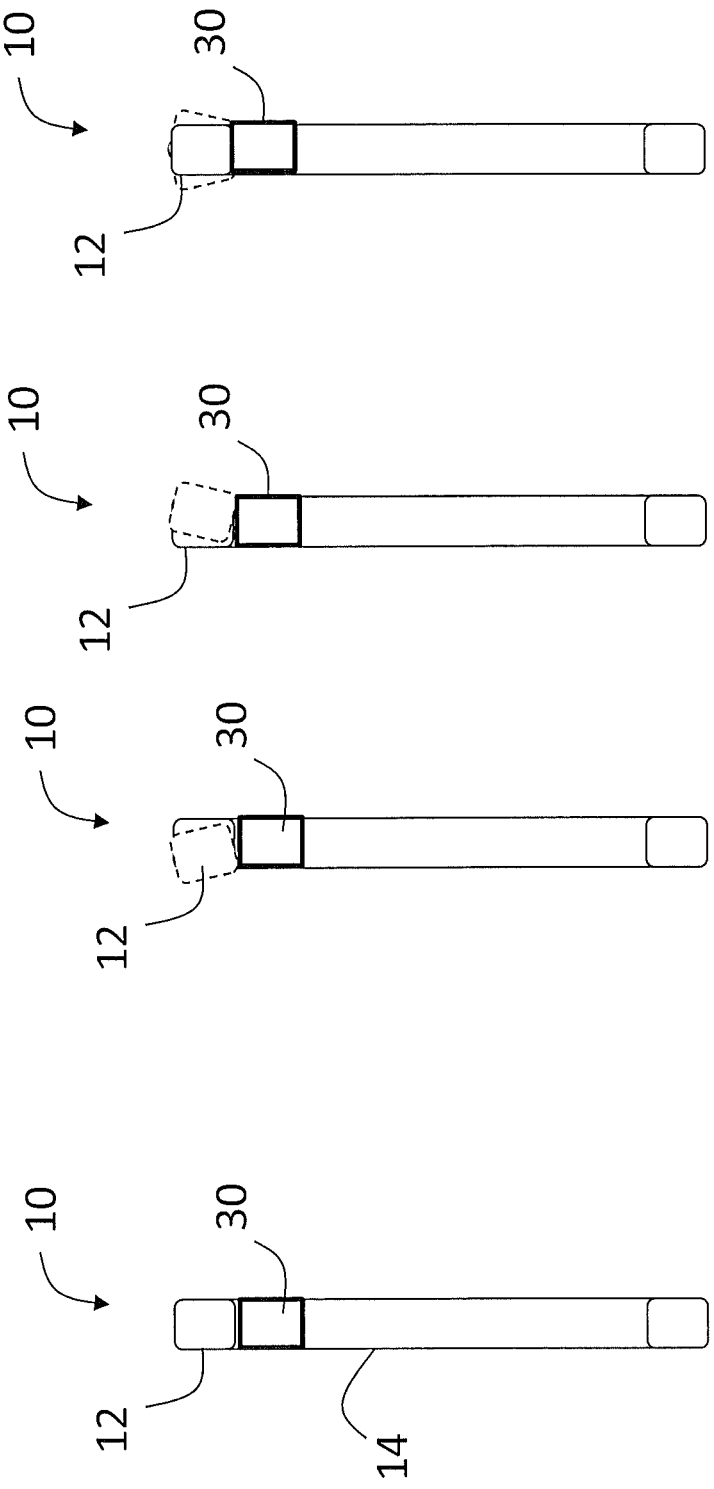

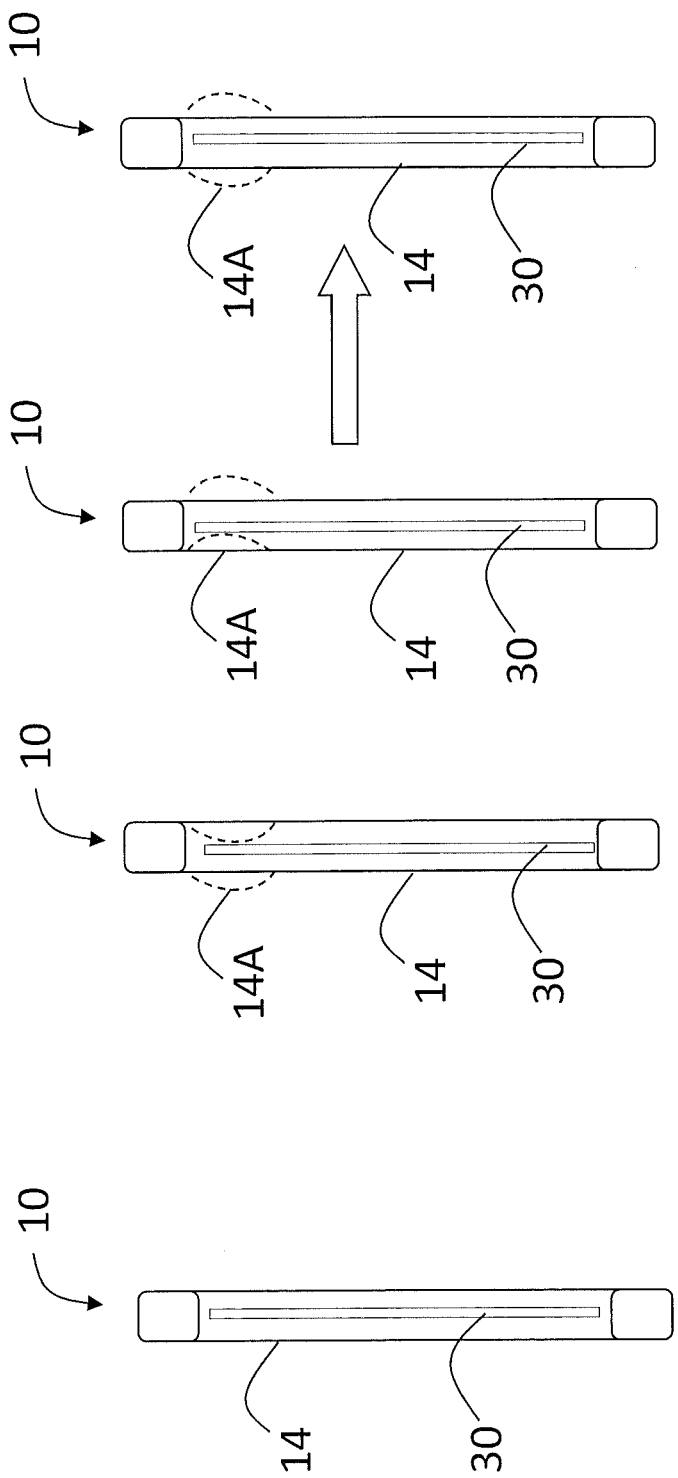

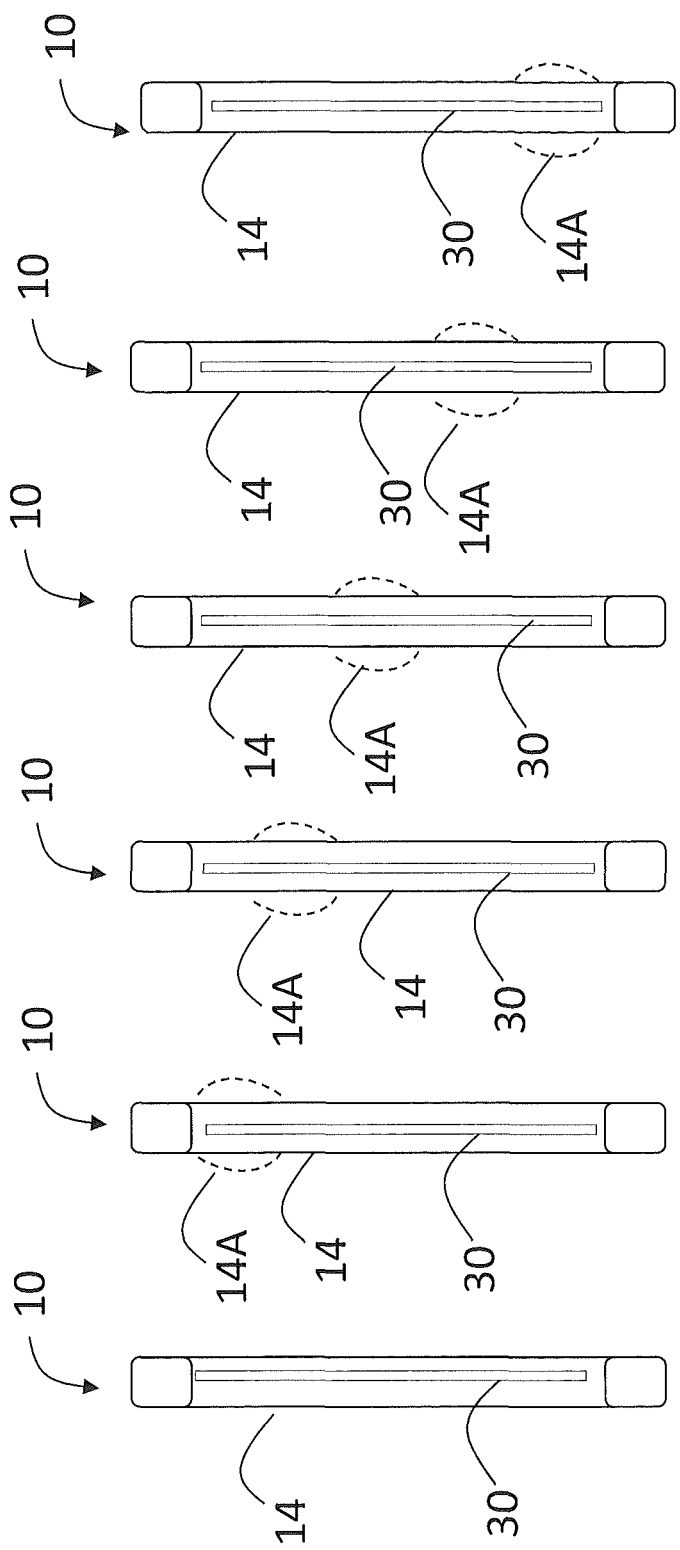

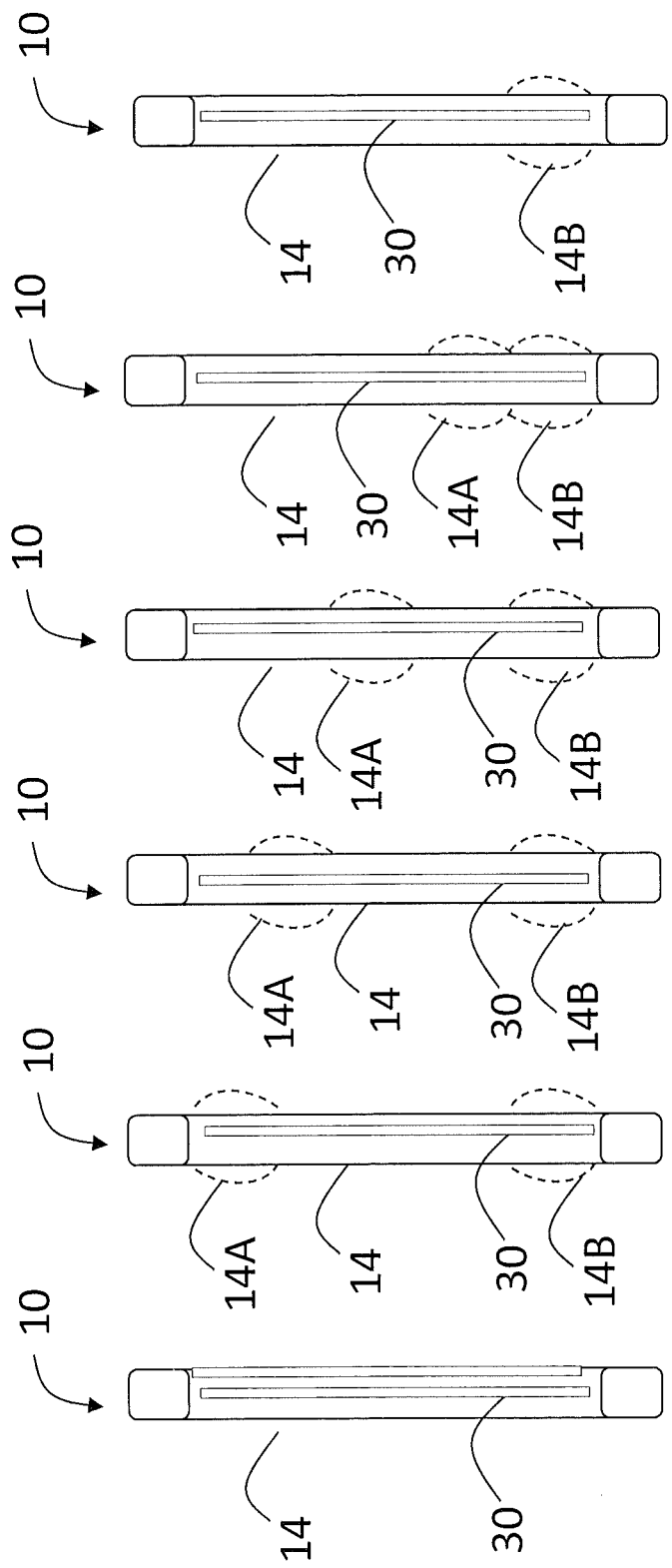

GENERATION OF MOBILE DEVICE VIBRATORY NOTIFICATION

BACKGROUND

The present disclosure relates generally to mobile devices, and more particularly, to the generation of a vibratory notification on a mobile device.

Mobile devices (e.g., mobile phones, tablets, etc.) often include a variety of notifications of events. Existing notifications include audible notifications (e.g., a tone) and tactile or vibratory notifications. Typically, a vibratory notification is generated by a motor embedded in the mobile device. As mobile devices reduce in size, the components within the mobile device must be selected to accommodate the smaller footprint. Motors for vibratory notifications add weight and size to mobile devices.

BRIEF SUMMARY

Exemplary embodiments include a mobile device comprising: a housing; a flexible display mounted in the housing; an actuator coupled to the flexible display; a processor; and a computer readable medium with computer-executable instruction stored thereon, that when executed by the processor cause the processor to initiate operations including: generating a vibratory notification by sending a command signal to the actuator to alter a position of the flexible display.

Other exemplary embodiments include a mobile device comprising: a housing having a movable portion; a display mounted in the housing; an actuator coupled to the movable portion of the housing; a processor; and a computer readable medium with computer-executable instruction stored thereon, that when executed by the processor cause the processor to initiate operations including: generating a vibratory notification by sending a command signal to the actuator to alter a position of the movable portion of the housing.

Other exemplary embodiments include a method of generating a vibratory notification on a mobile device, the method comprising: determining that the vibratory notification is needed; determining a status of an actuator in the mobile device; and providing a command signal to the actuator to alter a position of a flexible display of the mobile device to produce the vibratory notification.

Other exemplary embodiments include a computer program product, tangibly embodied on a computer readable medium, for generating a vibratory notification on a mobile device, the computer program product including instructions that, when executed by a processor, cause the processor to perform operations comprising: determining that the vibratory notification is needed; determining a status of an actuator in the mobile device; and providing a command signal to the actuator to alter a position of a flexible display of the mobile device to produce the vibratory notification.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIGS. 5A-5D illustrate a vibratory notification in an exemplary embodiment;

FIGS. 6A-6D illustrate a vibratory notification in an exemplary embodiment;

FIGS. 7A-7F illustrate a vibratory notification in an exemplary embodiment;

FIGS. 8A-8F illustrate a vibratory notification in an exemplary embodiment;

The detailed description explains the exemplary embodiments, together with advantages and features, by way of example with reference to the drawings.

DETAILED DESCRIPTION OF EXEMPLARY EMBODIMENTS

Figure 1:
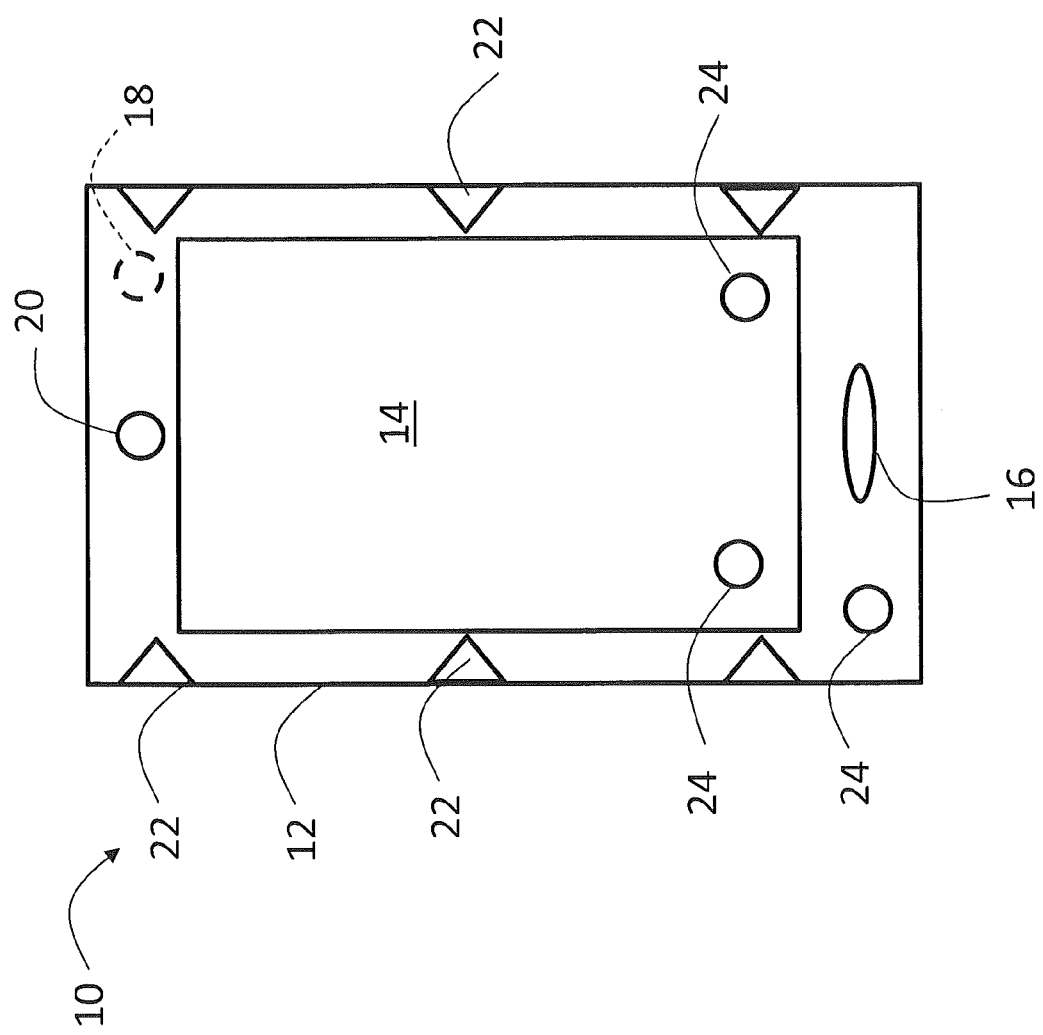
FIG. 1 depicts a mobile device with a flexible display in an exemplary embodiment.

FIG. 1 depicts a mobile device 10 with a flexible display 14 in an exemplary embodiment. Mobile device 10 may be a phone, tablet, personal digital assistant, etc., equipped with communications components (e.g., cellular, wireless LAN, NFC, Bluetooth, USB) for communicating over wireless or wired communications mediums. Mobile device 10 includes a housing 12 that supports flexible display 14. Flexible display 14 may be any known type of flexible display such as a flexible organic light emitting diode (OLED) display of flexible liquid crystal diode (LCD) display.

Mobile device 10 includes a microphone 16. Microphone 16 is used for voice communications and for receiving spoken commands from a user. A camera 18 may be located on a back side of housing 12. A speaker 20 provides audio output to the user. Mobile device 10 also includes one or more buttons 24 for controlling the device. Buttons 24 may be permanent components built into housing 12 or may be virtual buttons, presented on flexible display 14, activated by touching flexible display 14. One or more sensors 22 are positioned on housing 12 to sense various parameters such as contact, temperature, motion, etc.

Figure 2:
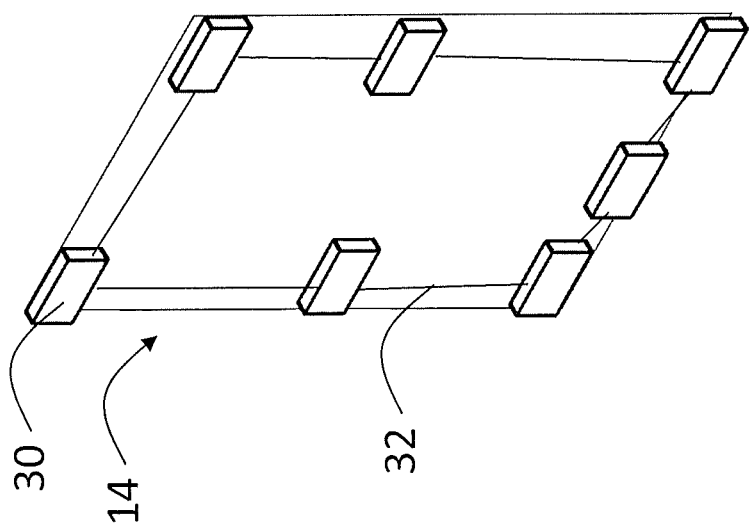
FIG. 2 depicts a flexible display in an exemplary embodiment.

FIG. 2 depicts a flexible display 14 in an exemplary embodiment. A plurality of actuators 30 are positioned on a back side of flexible display 14. Actuators 30 may be implemented using known force transmitting devices (e.g., electromagnetic, pneumatic, hydraulic, electromechanical, etc.). Actuators 30 may also be coupled to other portions of the mobile device 10, such as a housing 12 positioned around flexible display 14. Actuators 30 operate to impart motion to flexible display 14 and/or other components of mobile device 10, in response to command signals from a processor, as described in further detail herein. In exemplary embodiments, actuators 30 include tension wires, which change shape when the appropriate electrical current is applied. Actuators 30 may be interconnected by links 32 (e.g. wires, pins, etc.) to provide support for display shapes. Since the positional arrangement of actuators 30 is known, the necessary command signals required to create a desired display shape can be calculated by a processor.

Figure 3:
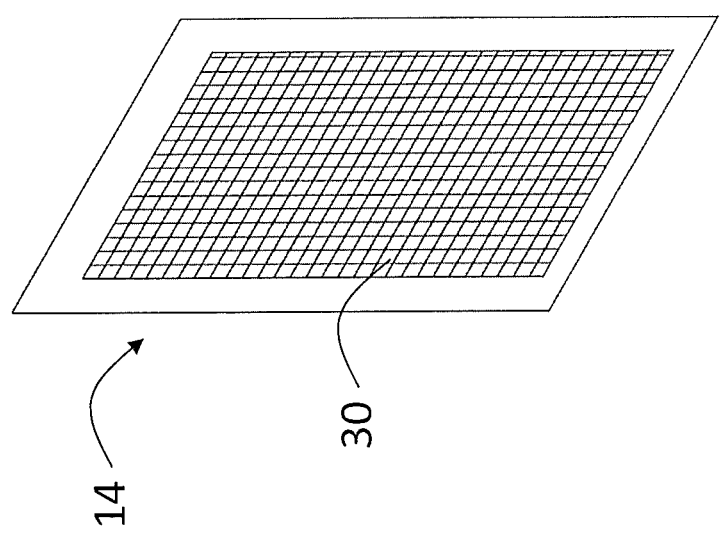
FIG. 3 depicts a flexible display in another exemplary embodiment.

FIG. 3 depicts a flexible display 14 in another exemplary embodiment. In this embodiment, actuator 30 positioned on a back side of flexible display 14 includes a mesh actuator 30. The actuator 30 may include a grid of tension wires, which change shape when the appropriate electrical current is applied. Actuator 30 may also be coupled to other portions of mobile device 10, such as a housing 12 positioned around flexible display 14. Actuator 30 operates to impart motion to flexible display 14 and/or other components of the mobile device 10, in response to command signals from a processor, as described in further detail herein.

Figure 4:
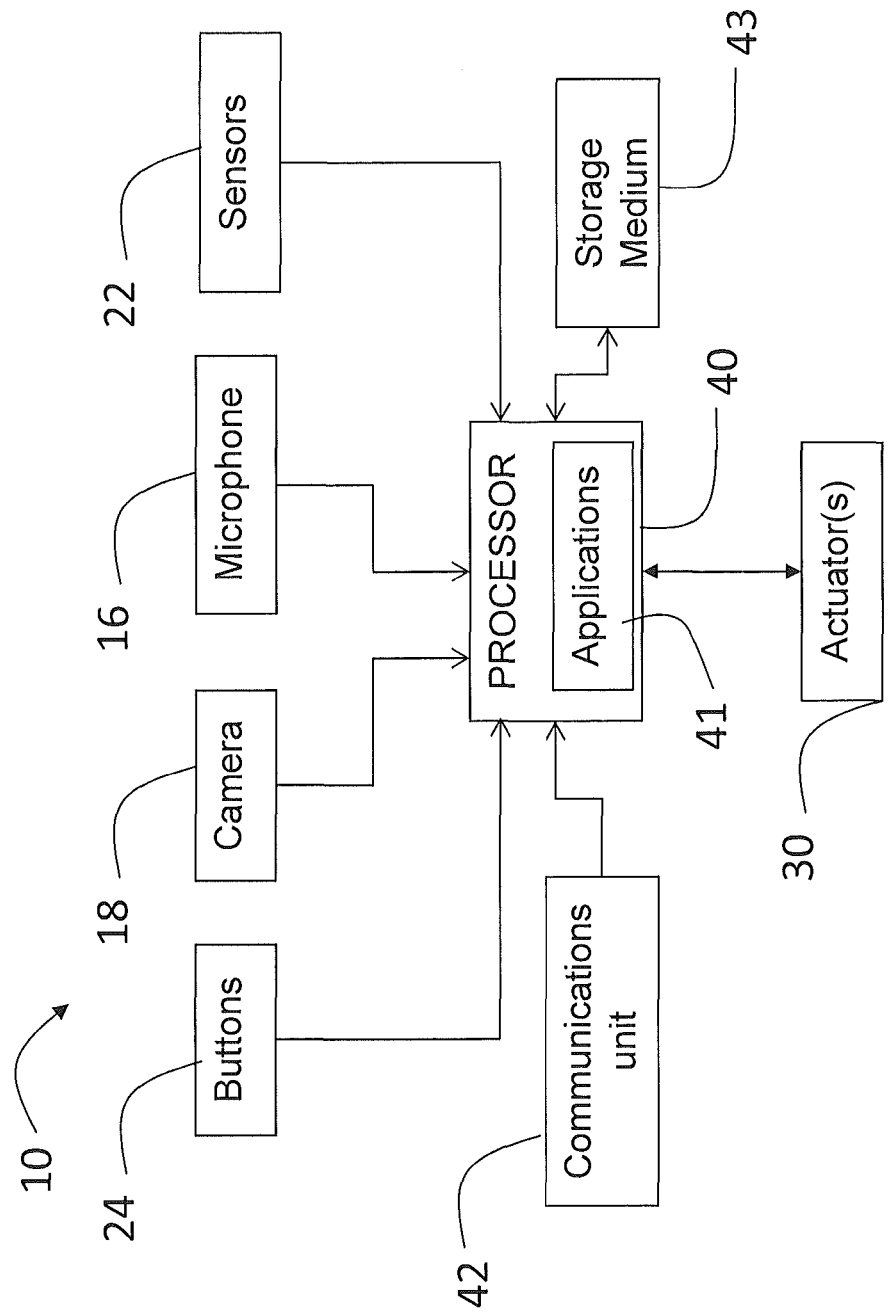
FIG. 4 depicts a system for generating a vibratory notification in an exemplary embodiment.

FIG. 4 depicts a system for generating a vibratory notification on mobile device 10 in an exemplary embodiment. A processor 40 is coupled to buttons 24, camera 18, microphone 16, and sensors 22. Processor 40 may be implemented using a general-purpose microprocessor executing a computer program stored in a computer readable storage medium 43 to execute the processes described herein. Processor 40 is also coupled to a communications unit 42 that handles communications between the mobile device 10 and other devices, such as cellular phone calls, NFC communications, Bluetooth, etc. Processor 40 may also execute a number of applications 41 that generate user notifications, such as a calendar application, navigation application, entertainment applications, etc. When a vibratory notification is needed, processor 40 generates command signals to one or more actuators 30 to generate a vibratory notification on mobile device 10. Processor 40 also receives status signals from actuators 30 identifying a current position of flexible display 14. Based on the various inputs, processor 40 generates command signals to one or more actuators 30 to generate a vibratory notification on the mobile device 10.

FIGS. 5A-5D illustrate one example of a vibratory notification on mobile device 10. As shown in FIG. 5A, actuator 30 of mobile device 10 is coupled to a movable portion of housing 12. This movable portion of housing 12 is capable of pivoting relative to flexible display 14. When processor 40 determines that a vibratory notification is needed, command signals are provide to actuator 30 to manipulate moveable portion of housing 12 to vibrate. Command signals from processor 40 cause actuator 30 to alter a position of the movable portion of housing 12 between a first position, as shown in FIG. 5B, and a second position, as shown in FIG. 5C. FIG. 5D illustrates the movable portion of housing 12 transitioning between the first position and the second position. The frequency of movement of the movable portion of housing 12 is sufficient to create a vibratory notification.

FIGS. 6A-6D illustrate another example of a vibratory notification on mobile device 10. As shown in FIG. 6A, actuator 30 of mobile device 10 may be a mesh actuator positioned on the back of flexible display 14. When processor 40 determines that a vibratory notification is needed, command signals are provide to actuator 30 to manipulate flexible display 14 to vibrate. Command signals from processor 40 cause actuator 30 to alter the position of portion 14A of flexible display 14 between a first position, as shown in FIG. 6B, and a second position, as shown in FIG. 6C. The first position corresponds to portion 14A of flexible display 14 being convex and the second position corresponds to portion 14A of flexible display 14 being concave. FIG. 6D illustrates portion 14A transitioning between the first position and the second position. The frequency of movement of portion 14A of flexible display 14 is sufficient to create a vibratory notification.

FIGS. 7A-7F illustrate another example of a vibratory notification on mobile device 10. As shown in FIG. 7A, actuator 30 of mobile device 10 may be a mesh actuator positioned on the back of flexible display 14. When processor 40 determines that a vibratory notification is needed, command signals are provide to actuator 30 to manipulate portion 14A of flexible display 14 to vibrate. Command signals from processor 40 cause actuator 30 to alter the position of portion 14A of flexible display 14 between a first position second position, as shown in FIG. 7B, in a manner similar to that described with reference to FIGS. 6A-6D. The first position corresponds to portion 14A of flexible display 14 being convex and the second position corresponds to portion 14A of flexible display 14 being concave. The frequency of movement of portion 14A of flexible display 14 is sufficient to create a vibratory notification. As shown in FIGS. 7C-7F, vibrating portion 14A of flexible display 14 also translates from a first location (e.g., a top edge) on flexible display 14 to a second location on flexible display 14 (e.g., a bottom edge).

FIGS. 8A-8F illustrate another example of a vibratory notification on mobile device 10. As shown in FIG. 8A, actuator 30 of mobile device 10 may be a mesh actuator positioned on the back of flexible display 14. When processor 40 determines that a vibratory notification is needed, command signals are provide to actuator 30 to manipulate flexible display 14 to vibrate. Command signals from processor 40 cause actuator 30 to alter the position of first portion 14A of flexible display 14 between a first position and second position, as shown in FIG. 8B, in a manner similar to that described with reference to FIGS. 6A-6D. The first position corresponds to a portion of flexible display 14 being convex and the second position corresponds to that portion of flexible display 14 being concave. Command signals from processor 40 also cause actuator 30 to alter the position of second portion 14B of flexible display 14 between a first position and second position, as shown in FIG. 8B, in a manner similar to that described with reference to first portion 14A. The frequency of movement of portions 14A and 14B of flexible display 14 is sufficient to create a vibratory notification. As shown in FIGS. 8C-8F, first portion 14A of flexible display 14 also translates from a first location (e.g., a top edge) on flexible display 14 to a second location on flexible display 14 (e.g., a bottom edge) that coincides with portion 14B. The cycle may continue by again generating a vibrating first portion 14A at the first location, as shown in FIG. 8B and translating the vibrating first portion 14A, until the notification is terminated. It is understood that more than two vibrating portions may be employed, and the vibrating portions may move relative to one another as shown in exemplary FIGS. 8A-8F.

Figure 9B:
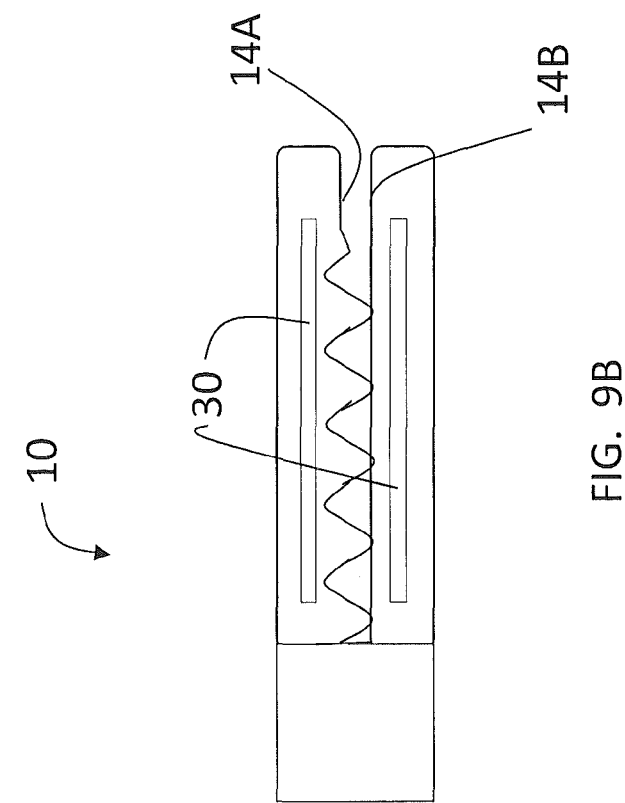
FIGS. 9A and 9B illustrate a notification in an exemplary embodiment.
Figure 9A:
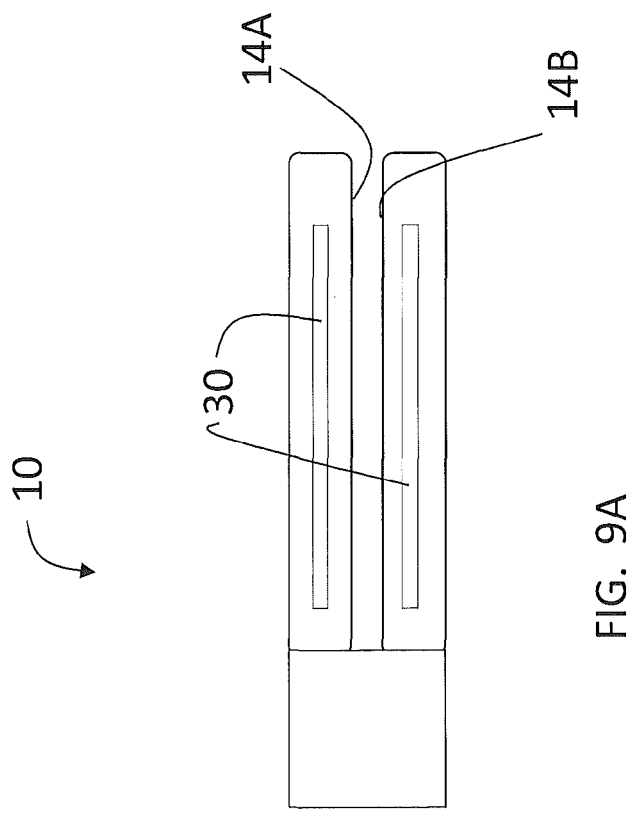

FIGS. 9A and 9B illustrate another example of a notification on mobile device 10. As shown in FIG. 9A, actuator 30 of mobile device 10 may be a mesh actuator positioned on the back of flexible display 14. In this embodiment, first portion 14A and second portion 14B of flexible display 14 are in contact with each other, or at least in proximity to each other and facing each other. For example, the mobile device 10 may close in a manner similar to a flip phone. When processor 40 determines that a notification is needed, command signals are provide to actuator 30 to manipulate flexible display 14. Command signals from processor 40 cause actuator 30 to alter the position of first portion 14A of flexible display 14, as shown in FIG. 9B. As shown in FIG. 9B, first portion 14A is caused to form a series of peaks and troughs along a first portion 14A of flexible display 14 (e.g. a sine wave). The peaks of first portion 14A may be in contact with second portion 14B. One or both of first portion 14A and second portion 14B may be moved, to cause relative movement between first portion 14A and second portion 14B. The physical interaction between the first portion 14A and second portion 14B creates a vibration and an audible tone. The frequency of the audible tone may be adjusted by changing the frequency of relative movement between first portion 14A and second portion 14B. In this manner, an audible tone may be generated using just the flexible display 14.

Figure 10:
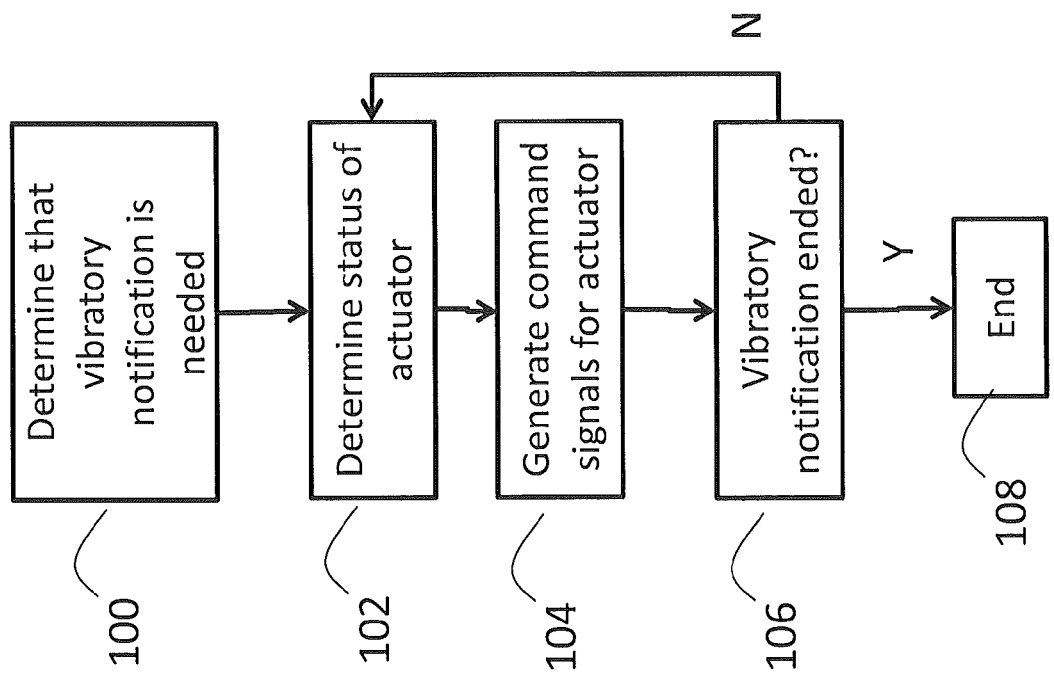
FIG. 10 is a flowchart of a process for generating a vibratory notification in an exemplary embodiment.

FIG. 10 is a flowchart of a process for generating a vibratory notification in an exemplary embodiment. The process may be implemented by processor 40 in response to computer program code stored in storage medium 43. The process begins at 100 where processor 40 determines that a vibratory notification is needed. A vibratory notification may be needed as a result of an incoming communication (e.g., an incoming call) where the user has selected vibratory notifications. The notification may also be necessitated by an application, such as a calendar or navigation application, where the user has specified vibratory notifications.

Once it is determined a notification is needed at 100, flow proceeds to 102 where processor 40 determines the status of actuator(s) 30. This may include polling the actuator(s) 30 for a current status signal or retrieving current status signals from a memory such as storage medium 43. The current status of actuator(s) 30 will indicate the command signals needed to generate the vibratory notification. At 104, processor 40 generates command signals to produce the vibratory notification and provides the command signals to actuator(s) 30. As described above, the vibratory notification may include one or more portions of flexible display 14 vibrating. In other embodiments, the entire flexible display 14 may vibrate. In other embodiments, processor 40 may determine from the status signals from actuator(s) 30 that flexible display 14 is folded in half (e.g., a flip phone). In such cases, portions (e.g., halves) of flexible display 14 may be commanded to vibrate against each other. In other embodiments, both the movable portion of housing 12 and flexible display 14 (either a portion or the entire flexible display 14) may be commanded to vibrate.

At 106, processor 40 determines if the need for the vibratory notification has ended. The vibratory notification may be terminated once an event initiating the vibratory notification has ended (e.g., an incoming is answered) or if a user switches to a different mode of notification (e.g., from vibratory to audible). If the need for the vibratory notification has not ended, flow proceeds to 102. If the need for the vibratory notification has ended, flow proceeds to 108 where the process is terminated.

The location of the vibrating portion of flexible display and/or the frequency of the vibration may be used to generate notifications that provide additional content to a user. In one exemplary embodiment, localized vibratory notifications are used in a navigation application. A user would not need to see or hear directions on the mobile device in order to know when to go straight, when to turn right or left, or even when they have gone too far and need to turn around. All of these commands are conveyed by the positioned of localized vibrations of flexible display 14.

In other embodiments, a user may assign a location of the flexible display to user-defined classifications. The number of classifications could be expanded by incorporating different frequencies as well as other types of notifications. These classifications may be assigned to incoming calls, specifically to who is calling. For example, a call from a first classification (e.g., friends) will cause a vibratory notification in a first portion of flexible display 14. A call from a second classification (e.g., work) will cause a vibratory notification in a second portion of flexible display 14. A call from a high priority caller (e.g., family member) will cause a vibratory notification having a high frequency whereas a call from a low priority caller (e.g., unrecognized number) will cause a vibratory notification having a low frequency. Alternatively, classifications may be assigned to specific mobile device applications that have the ability to notify a user when a given event occurs. One portion of flexible display 14 may be assigned to generate a vibratory notification in response to a social network application (e.g., Facebook). Another portion of flexible display 14 may be assigned to generate a vibratory notification in response to a news application. Thus, both location and frequency of the vibrating portion may be used to convey additional information associated with the notification.

Using flexible display 14 and/or a moveable portion of housing 12 to generate vibratory notifications eliminates the need for a motor or other component in the mobile device 10. This frees up highly valuable internal space in mobile device 10 and reduces weight.

As described above, the exemplary embodiments can be in the form of processor-implemented processes and devices for practicing those processes, such as processor 40. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A mobile device comprising:
a housing;
a flexible display mounted in the housing;
an actuator coupled to the flexible display;
a processor; and a computer readable medium with computer-executable instruction stored thereon, that when executed by the processor cause the processor to initiate operations including:

generating a vibratory notification by sending a command signal to the actuator to create a vibrating portion of the flexible display and to translate the vibrating portion along the flexible display from a first location to a second location and across at least one location between the first location and the second location while simultaneously causing vibration in the vibrating portion;

wherein:

the actuator generates a status signal indicating a current status of the actuator; and the processor generates the command signal in response to the status signal.

2. The mobile device of claim 1 wherein:
the vibrating portion alternates between convex and concave.

3. The mobile device of claim 1 wherein:
generating the vibratory notification includes creating a second vibrating portion of the flexible display.

4. The mobile device of claim 3 wherein:
generating the vibratory notification includes altering a location of the second vibrating portion of the flexible display.

5. The mobile device of claim 1 wherein:
generating the vibratory notification includes controlling frequency of the vibratory notification in response to a user-defined classification.

6. The mobile device of claim 1 wherein:
generating the vibratory notification includes controlling location of the vibratory notification on the flexible display in response to a user-defined classification.

7. The mobile device of claim 1 wherein:
generating the vibratory notification includes controlling frequency of the vibratory notification and location of the vibratory notification on the flexible display in response to a user-defined classification.

8. The mobile device of claim 1 wherein:
the actuator is a mesh actuator positioned beneath the flexible display.

9. A method of generating a vibratory notification on a mobile device, the method comprising:
determining that the vibratory notification is needed; and
providing a command signal to an actuator to alter a position of a flexible display of the mobile device to produce the vibratory notification;
wherein producing the vibratory notification comprises creating a vibrating portion of the flexible display and translating the vibrating portion across the flexible display from a first location to a second location and across at least one location between the first location and the second location while simultaneously causing vibration in the vibrating portion;
wherein:
the actuator generates a status signal indicating a current status of the actuator; and
the providing the command signal is in response to the status signal.

10. A computer program product, tangibly embodied on a non-transitory computer readable medium, for generating a vibratory notification on a mobile device, the computer program product including instructions that, when executed by a processor, cause the processor to perform operations comprising:
determining that the vibratory notification is needed; and
providing a command signal to an actuator to alter a position of a flexible display of the mobile device to produce the vibratory notification;
wherein producing the vibratory notification comprises creating a vibrating portion of the flexible display and translating the vibrating portion across the flexible display from a first location to a second location and across at least one location between the first location and the second location while simultaneously causing vibration in the vibrating portion;
wherein:
the actuator generates a status signal indicating a current status of the actuator; and
the providing the command signal is in response to the status signal.

11. A mobile device comprising:
a housing;
a flexible display mounted in the housing;
an actuator coupled to the flexible display;
a processor; and
a computer readable medium with computer-executable instruction stored thereon, that when executed by the processor cause the processor to initiate operations including:
generating a vibratory notification by sending a command signal to the actuator to create a vibrating portion of the flexible display and to translate the vibrating portion along the flexible display from a first location to a second location and across at least one location between the first location and the second location while simultaneously causing vibration in the vibrating portion;
wherein the actuator comprises a plurality of tension wires, the tension wires configured to change shape upon application of an electrical current to the tension wires.

* * * * *